Figure 1:
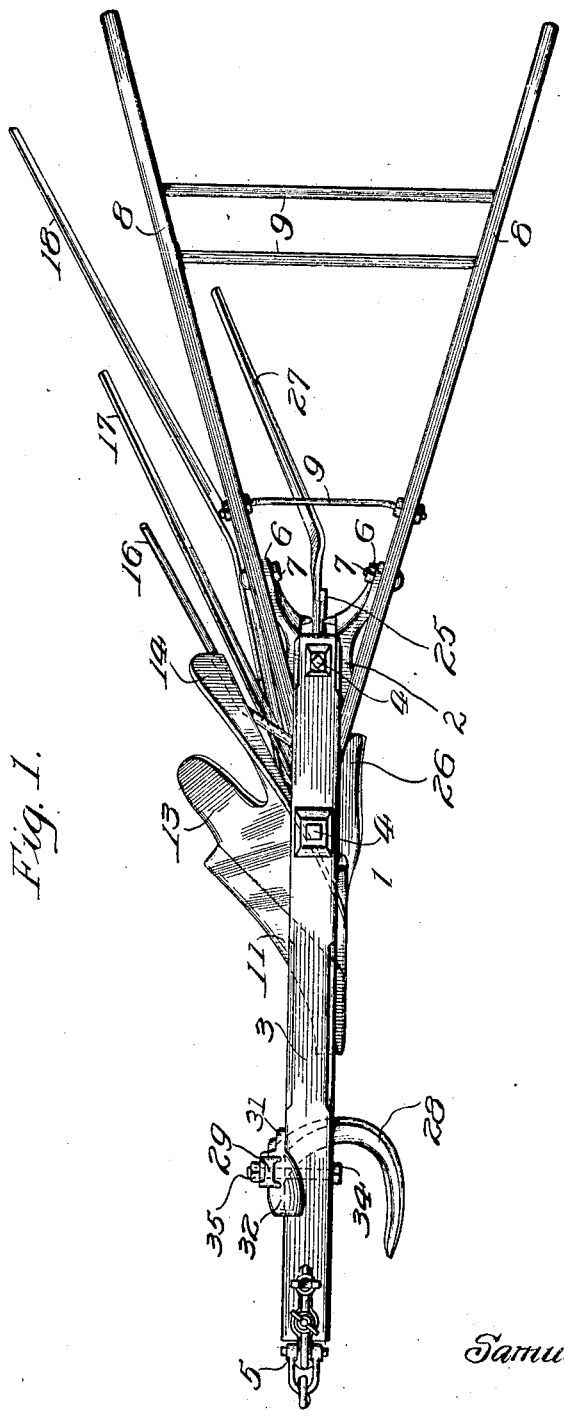

S. L. ALLEN.
POTATO DIGGER.
APPLICATION FILED DEC. 23, 1907.

920,104.

Patented May 4, 1909.
3 SHEETS—SHEET 1.

WITNESSES

INVENTOR
Samuel L. Allen.

BY

ATTORNEY

S. L. ALLEN.
POTATO DIGGER.
APPLICATION FILED DEC. 23, 1907.

920,104.

Patented May 4, 1909.
3 SHEETS—SHEET 2.

Fig. 2.

INVENTOR
Samuel L. Allen.

WITNESSES

BY

ATTORNEY

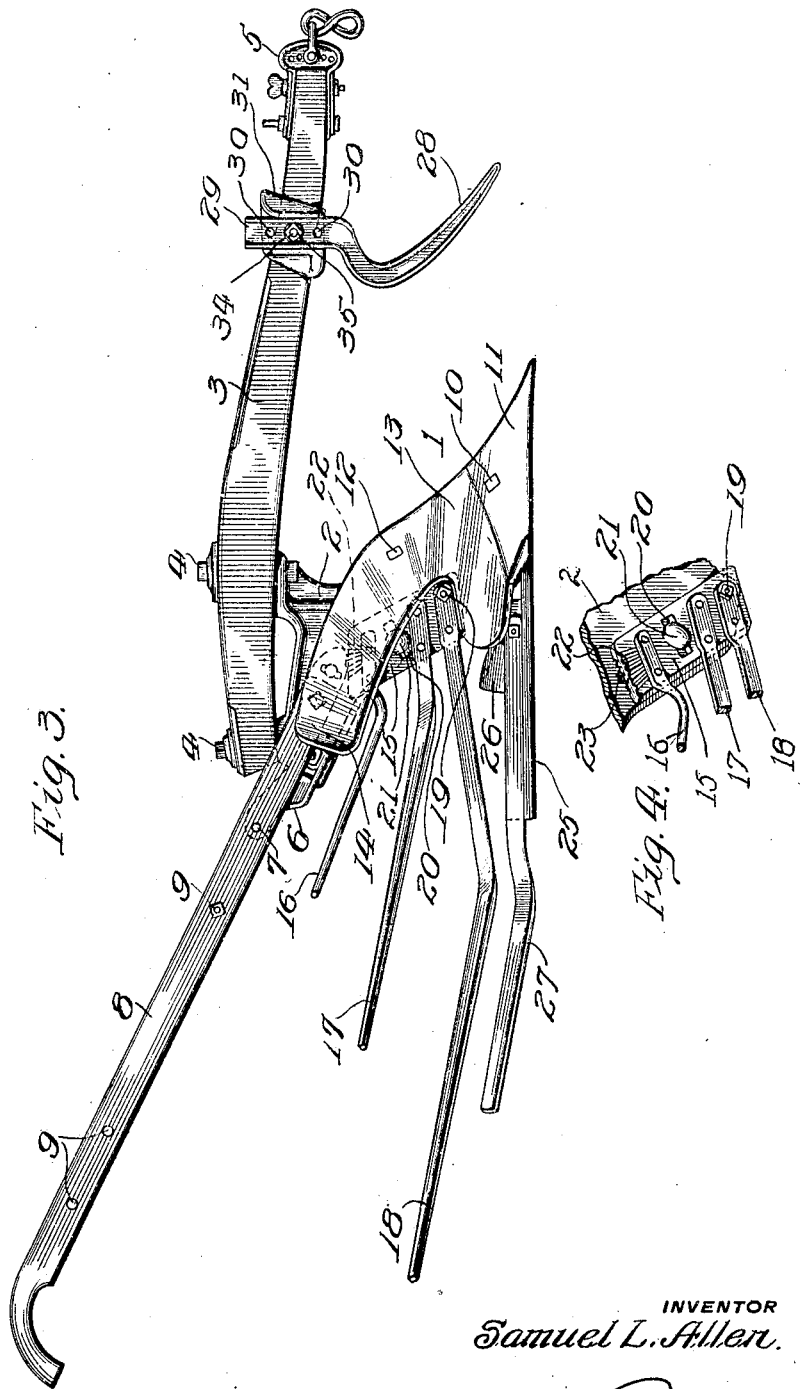

UNITED STATES PATENT OFFICE.

SAMUEL L. ALLEN, OF MOORESTOWN, NEW JERSEY.

POTATO-DIGGER.

No. 920,104.	Specification of Letters Patent.	Patented May 4, 1909.

Application filed December 23, 1907. Serial No. 407,728.

*To all whom it may concern:*

Be it known that I, SAMUEL L. ALLEN, a citizen of the United States, residing in Moorestown, county of Burlington, State of New Jersey, have invented certain new and useful Improvements in Potato-Diggers, of which the following is a full, clear, and complete disclosure.

My invention relates particularly to that class of potato-diggers in which a plow is used to furrow beneath the potatoes and break up and spread out the earth turned up from the furrow, leaving the potatoes on the surface.

The objects of my invention are:—to provide in a potato-digger, a plow having an improved form of mold-board for opening and turning up the earth and for bringing the potatoes to the surface thereof; to provide means arranged to break up and spread out the earth turned up and to insure the final exposure upon the surface thereof of all of the potatoes turned up by the plow; to provide a simple means of adjustment of the digger for various grades of work; to provide means for filling the bottom of the furrow, immediately behind the plow, with earth before the potatoes have an opportunity to lodge therein; to provide other improvements which will appear in the following description and claims; and in general to provide a potato-digger of simple, durable and inexpensive construction which will be easy to operate and which will do the work for which it was intended with a high degree of efficiency.

In the accompanying drawings, Figure 1 is a top plan view of a potato-digger constructed in accordance with this invention; Fig. 2, an elevation of the left hand side, and Fig. 3 an elevation of the right hand side of the same; and Fig. 4 a perspective view of a detail of the same.

Referring to the drawings, the potato-digger comprises a plow 1, having a vertical standard 2 carrying a forwardly extending beam 3, attached to the upper portion thereof by means of bolts 4, the forward end of the beam being provided with the usual traction clevis 5. The rear upper portion of the standard is provided with upwardly and outwardly extending arms 6, to which are attached by bolts 7, the usual handles 8 provided with cross braces 9.

Secured to the lower front portion of the plow standard by means of a bolt 10 is a plow-share 11 above which and secured to the right side of the standard by means of a bolt 12 is a mold-board 13. The lower outer portion of the mold-board diverges rearwardly and upwardly from the upper edge of the plow-share for a short distance and is then curved inwardly to meet the inner and upper portion of the mold-board which is extended rearwardly, outwardly and upwardly, forming a wing or shield 14, the upper portion of which faces downwardly for the purpose of preventing the potatoes that are lying exposed on the comb of the furrow slice as it is turned up on edge, from dropping into the open furrow behind the plow, where they would be in danger of being buried, when the furrow slice is being spread out by the digging arms or fork. The lower half of the mold-board 13 elevates the furrow slice containing the potatoes, and turns it on edge in the proper position for disintegration and spreading by the digger fork which follows.

Upon the right hand side of the plow standard and in the rear of the mold-board is secured a vertical plate 15, carrying, rigid therewith the rearwardly and outwardly extending arms 16, 17 and 18 arranged to receive the earth turned up by the mold-board and to break it up and spread the same. These arms are preferably tapering to lessen the weight thereof without decreasing their rigidity and the upper arm 16 is preferably rounded in cross section to serve as a handle for adjusting the plate 15 as hereinafter described, and the arms 17 and 18 are preferably flattened and have their front sides facing obliquely downward. The arm 18 projects rearwardly and outwardly from the plow and the rear end of the arm is turned outwardly away from the direction of the forward portion of the same. The said plate 15, carrying these arms is pivoted to the plow standard by means of a bolt 19 which extends through the plate and standard and also through the inner end of the said arm 18 whereby the arm 18 is also held in position upon the plate. The central portion of the plate is provided with a transverse recess 20 having preferably curved upper and lower sides concentric with the pivotal support 19 of the plate. Within this recess and secured through the plow-standard is a bolt or headed projection 21, the head of which overlaps the plate and holds the plate in adjustable position against the side of the standard. As an additional means to prevent the relative movement of the plate with respect to the standard, the plate is provided with a series of serrations 22 arranged radially with respect to the axis 19 of the plate, and the standard is provided with a corresponding lug 23, adapted to engage in any one of the serrations.

The land side of the plow is formed with a plate 24 which is secured to the plow standard by means of the above mentioned bolts 10 and 19, the former of which passes through the standard and the plow-share, and the latter of which is used to pivotally support the rearwardly extending arms on the right side of the plow. The lower portion of this plate 24 is provided with a rearward extension 25, the lower edge of which is in alinement with the lower edge of the main part of the plate, which constitutes the lower edge of the land side of the plow. This plate is provided with a supplementary mold-board 26 which extends from the lower front portion of the plate, rearwardly, outwardly and upwardly, forming a groove with the plate, and terminates in the rear of the main portion of the plate. This supplemental mold-board is adapted to cut a relatively small furrow in the vertical side of the main furrow made by the plow and to turn the earth from this furrow inwardly over the extension 25 into the space between the two sides of the plow and into the bottom of the main furrow made by the plow before the potatoes turned up by the mold-board upon the right hand side of the plow, have a chance to fall into the furrow in the rear of the mold-board, thus preventing the potatoes from being covered from view in the furrow. The rearward extension 25 of the plate 24 upon the land side, serves to support the rear portion of the supplementary mold-board 26 and also carries the rearwardly extending flat arm 27, the rear end of which is slightly turned to bring it in a plane oblique to the ground, and extends inwardly and slightly upwardly and acts to further break up and spread the ground behind the plow, and to bring to the surface any potatoes which may happen to fall into the furrow over the mold-board and arms upon the right side of the plow.

The forward end of the plow-beam is provided with an arm 28 which curves downwardly, forwardly and to the left of the plow for the purpose of picking up the potato vines and moving them into alinement with the plow to avoid clogging under the beam of the plow. This arm 28 is provided with a vertical shank 29 which is provided with bolt holes 30. Between the said shank 29 and the beam is a bearing plate 31 having flanges 32 and 33 which project respectively over the top and under the bottom of the beam. The vertical face of this bearing plate is provided with a vertical recess into which snugly fits the said shank 29, the shank and plate being rigidly connected to the beam by means of a bolt 34, passing through the beam and provided with a nut 35.

In operation, this potato-digger is held and used exactly like an ordinary plow would be when plowing out potatoes, but in advancing, the arm 28 gathers up the potato vines or weeds or other obstructions in front of the plow and turns them into alinement therewith and in front of the mold-board side of the plow; the plow-share cuts into the earth beneath the potatoes, and the mold-board turns a furrow slice which carries the earth and potatoes upwardly and outwardly when the rearwardly extending arms 16, 17 and 18 break up and spread out the furrow slice, and the potatoes are separated from the earth and pushed to the surface. At the same time, the supplementary mold-board upon the land-side of the plow is acting to cut some of the earth from the land side of the furrow made by the plow and deposit it immediately in the rear of the plow in the bottom of the furrow, thus preventing any of the potatoes from falling into the bottom of the furrow and being covered. The rearwardly extending arm upon the land side of the plow further breaks up and spreads the earth and brings to the surface any potatoes left behind the plow.

Although I have shown and described only the preferred form in which this invention may be embodied, yet it is obvious that various changes of a mechanical nature may be made in the structure described, within the scope of the appended claims, without departing from the spirit of my invention or sacrificing any of the advantages thereof.

Having now fully described my invention and the best embodiment of the same at the present time known to me, I claim as my invention and desire to secure by Letters Patent of the United States:

1. The combination with a digger having a rearward extension, of means to throw earth over said extension into the space behind the digger.

2. The combination with a plow having a rearward extension upon the land side thereof, of means for throwing earth from the land side of said plow over said extension and into the space behind the plow.

3. The combination with a plow having a mold-board upon one side thereof, of a plate forming a portion of the land side thereof and a mold-board secured to said plate and forming a groove therewith, to deposit earth in the rear of said plow.

4. The combination with a plow, of a mold-board projecting from the land side thereof and forming a groove therewith for depositing earth from the land side of the plow to the rear thereof.

5. The combination with a plow, of a mold-board projecting from the land side thereof and extending from a point intermediate of the front and rear edges of the main portion of the land side of the plow, rearwardly, to deposit earth in the rear of the plow.

6. The combination with a plow, of an oblong mold-board upon the land side thereof extending from a point intermediate of the front and rear edges of the main portion of said land side rearwardly, to deposit earth in the rear of said plow.

7. In a digger, the combination with a plow having a plow share upon one side thereof, of a flat arm secured to the opposite side thereof and projecting rearwardly of the plow.

8. In a digger, the combination with a plow having a plow share upon one side thereof, of a flat arm secured to the opposite side thereof and projecting rearwardly and inwardly of the plow, the longitudinal axis of said arm being oblique to the ground plane.

9. In a digger, the combination with a plow having a plow share upon one side thereof, of an arm, having a flat face, secured to the opposite side thereof, and projecting rearwardly and obliquely of the plow.

10. In a digger the combination with a plow of means for breaking up the earth turned up thereby, comprising a plate pivoted thereto and provided with a slot, a plurality of diverging arms attached to said plate, and a bolt passing through said slot and connecting said plate to said plow.

11. The combination with a plow, of means for breaking up the earth turned up thereby, comprising a plate pivoted thereto upon a substantially horizontal axis extending transversely of the plow, an arm secured to said plate, and means to adjust the angularity of said plate with respect to said plow.

12. In a digger, a standard having a vertical portion, provided with an aperture, a plate provided with a slot, diverging arms attached to said plate, a bolt passing through said slot and said aperture to connect said plate and said vertical portion, a serrated portion on said plate and a coöperating lug on said vertical portion.

13. A digger comprising a plow standard, a plow share secured to one side of said standard, a mold-board extending rearwardly and upwardly from said plow share and having a rearwardly, upwardly and outwardly extending portion forming a shield having a substantially concave face, and arms secured to said standard and projecting rearwardly of and substantially below the upper edge of said shield to break up the earth turned up by said plow share.

14. A digger comprising a plow standard, a plow share secured to one side of said standard, a mold-board extending rearwardly and upwardly from said plow share and having a rearwardly, upwardly and outwardly extending shield, a plate adjustably secured to said standard and arms secured to said plate and arranged one above the other in the rear of said mold-board.

15. A digger comprising a standard, a forwardly extending beam and rearwardly extending handle secured to said standard, a plow share and mold-board attached to one side of said standard, a plate adjustable about an axis upon the same side of said standard in the rear of said plow share, rearwardly extending arms connected to said plate, and a downwardly extending arm connected to said beam in advance of said plow share.

16. The combination with a plow, of means for breaking up the earth turned up thereby, comprising an arm secured to said plow upon a substantially horizontal axis extending transversely of the plow, and means for adjusting the angularity of said arm with respect to said plow.

17. The combination with a plow, of means for breaking up the earth turned up thereby, comprising a plate secured to said plow upon a substantially horizontal axis extending transversely of the plow, a plurality of arms attached to said plate, and means for adjusting the angularity of said plate with respect to said plow.

18. The combination with a plow, of means for breaking up the earth turned up by the plow comprising an arm having a flattened face extending rearwardly and outwardly from the furrow side of said plow, the rear end of said arm being turned outwardly away from the direction of the forward portion of the arm.

19. The combination with a plow, of a flat arm extending in the rear of the plow from one side toward the other side thereof and in a plane oblique to the ground plane of the plow and in proximity thereto to spread the ground behind the plow.

20. The combination with a plow, of a mold-board upon the land side thereof, extending from a point intermediate of the front and rear edges of the main portion of the said side rearwardly to deposit earth in the rear of said plow.

21. In a digger, the combination with a plow, of a plow share upon one side thereof, and a flat arm secured to the opposite side thereof and projecting rearwardly and inwardly of the plow, the longitudinal axis of said arm and the face side of said arm being oblique to the ground plane.

22. The combination with a plow, of means for breaking up the earth turned up thereby, comprising a substantially vertical plate extending substantially longitudinally of the plow and mounted thereon to be moved through a limited arc, an arm secured to said plate, and means to adjust the angularity of said plate with respect to said plow.

23. The combination with a plow, of a mold-board having a rearwardly and outwardly extending upper portion forming a downwardly facing shield, and arms secured to said plow and extending rearwardly and outwardly with respect to said mold-board for breaking up the earth turned up thereby.

24. The combination with a plow, of a mold-board having a rearwardly and outwardly extending upper portion forming a downwardly facing shield, and means secured to said plow and extending rearwardly and outwardly with respect to said mold-board for breaking up the earth turned up thereby.

25. The combination with a plow, of means upon the land side thereof, extending from a point intermediate of the front and rear edges of the main portion of said side, rearwardly, to deposit earth in the rear of said plow.

26. In a digger, the combination with a plow, of an arm having a substantially flat face, said arm being secured to one side of the plow and extending toward the other side of the plow and in the rear of the plow adjacent to the ground plane.

27. In a digger the combination with a plow, of an arm having a substantially flat face, said arm being secured to one side of the plow and extending toward the other side of the plow and in the rear of the plow adjacent and oblique to the ground plane.

28. The combination with a plow, of means for breaking up the earth turned up thereby, comprising a plate secured to said plow and adjustable thereon, and a plurality of arms attached to said plate, one of said arms being rounded in cross section to form a handle, and the remaining arms being flattened.

29. The combination with a plow, of a plate adjustably secured thereto, serrations between said plow and said plate, means for clamping the plate to the plow, and an arm secured to said plate for breaking up the earth turned up by the plow.

30. The combination with a plow, of a plate pivoted thereto, an arm secured to said plate for breaking up the earth turned up by the plow, means for clamping said plate to said plow, and serrations between said plow and said plate and radiating from the axis of said plate to hold said plate in position.

In witness whereof, I hereunto set my hand this 21st day of December, A. D. 1907.

SAMUEL L. ALLEN.

Witnesses:
A. I. GARDNER,
ALEXANDER PARK.